S. J. CLUTE & D. M. DURFEE.

Gloves.

No. 6,352. Reissued March 30, 1875.

Witnesses;

Jas F. Duhamel.

Thomas Ryne.

Inventors;

S. J. Clute.

D. M. Durfee.

Per H. S. Abbot.

Attorney.

UNITED STATES PATENT OFFICE.

SOLOMON J. CLUTE AND DANIEL M. DURFEE, OF ROCKWOOD, NEW YORK.

IMPROVEMENT IN GLOVES.

Specification forming part of Letters Patent No. 129,934, dated July 30, 1872; reissue No. 6,352, dated March 30, 1875; application filed February 25, 1875.

*To all whom it may concern:*

Be it known that we, SOLOMON J. CLUTE and DANIEL M. DURFEE, of Rockwood, in the county of Fulton and State of New York, have invented certain new and useful Improvements in Gloves; and we do hereby declare that the following is a full, clear, and exact description thereof, that will enable others skilled in the art to which it appertains to make and use the same, reference being had to the accompanying drawings, and to the letters of reference marked thereon, which form a part of this specification.

Our invention relates to that class of gloves which are known to the trade as the "Plymouth Glove;" and has for its object to adapt said glove for the attachment of a wrist, so as to form a gauntlet, or, as we term it, a "Plymouth Gauntlet." The Plymouth glove, as now manufactured, is composed of a palm-piece and two fourchettes, the former being cut so as to form the backs of the first and fourth fingers, while the fourchettes form the backs of the second and third fingers. To adapt this glove to the reception of a wrist it is necessary to have a seam on the little-finger side of the glove, and to shorten the length of the palm-piece and fourchettes. The best and easiest way of making the seam on the little-finger side we have found is by the use of three fourchettes instead of two, the additional fourchette forming the back of the little finger, and the palm-piece correspondingly reduced in width. The nature of our invention, therefore, consists in a Plymouth glove formed with a seam on the little-finger side, and reduced in length to adapt it to receive a wrist and form a Plymouth gauntlet. Our invention also consists in a glove formed of a palm-piece, with finger projections, and three fourchettes, all as hereinafter more fully set forth.

Figure 4:
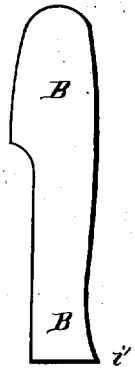
Figure 5:
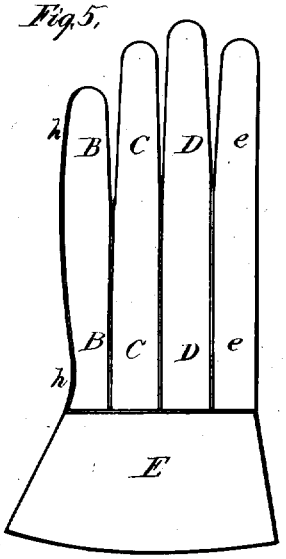
Figure 6:
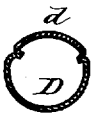

In the annexed drawing, Figures 1, 2, 3, and 4 are diagrams, showing the several pieces used for the hand and finger coverings of the glove. Fig. 5 is a top view of the glove. Fig. 6 is a section through one of the fingers.

Figure 1:
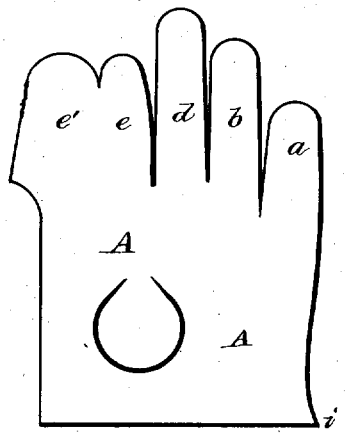
Figure 2:
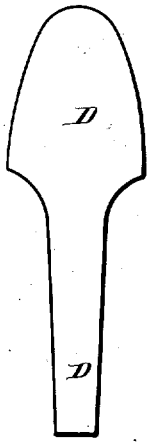
Figure 3:
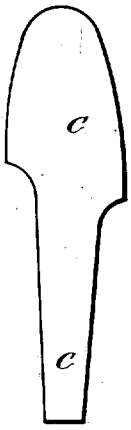

A represents the palm-piece of a glove, cut with the finger projections *a*, *b*, *d*, *e*, and *e'*. The fourchettes, which, in conjunction with the part *e'* of the palm-piece, form the back of the glove and part of the side portions of the fingers, are marked B C D. When united together a seam, *h h*, is formed on the little-finger side of the glove. In the Plymouth glove there is no seam on this side, the palm-piece and fourchette B being all in one piece, and the parts are made considerably longer. By our invention we reduce the palm-piece one-sixth in width and one-tenth in length on the upper or wrist end, or about twenty-five per cent. The fourchettes are shortened to correspond with the palm-piece. We also make an enlargement of the glove at the wrist by projecting the corner *i* of the palm-piece on the little finger, as shown in Fig. 1, and a similar enlargement, *i'*, on the third fourchette, B, that joins the palm-piece, as shown in Fig. 4, so as to give size at this point for the hand to pass through, as there is no elasticity where the wrist joins the glove. By this construction of the glove a wrist, E, can be easily attached, forming a gauntlet, called a Plymouth Gauntlet, as it is essentially a Plymouth glove transformed into a gauntlet. Another very important advantage resulting from this mode of cutting out the glove is, that a skin which is defective in many parts or places may be utilized where it could not be under the old practice, or by use of the ordinary patterns, it being always difficult to cut palm-pieces in sufficient number to use up the skins. This economic result is attained without any material offset by increased cost on account of the slight difference in labor in sewing or making up the glove, labor being always a small item of expense as compared with the stock or material used.

Having thus fully described our invention, what we claim as new, and desire to secure by Letters Patent, is—

1. A glove formed of a palm-piece having finger projections, as shown, and fourchettes, forming the back of the hand, with a seam on the little-finger side, and reduced in length to receive a wrist-piece, all constructed and arranged to form a gauntlet, substantially as described.

2. A glove formed of a palm-piece, A, provided with the finger projections, as shown, and the three fourchettes B C D, constructed and arranged substantially for the purposes herein set forth.

3. The enlarged or projected corners *i i'*, formed on the palm-piece A and fourchette B, respectively, substantially as and for the purposes herein set forth.

In testimony that we claim the foregoing we have hereunto set our hands this 15th day of February, 1875.

SOLOMON J. CLUTE.
DANIEL M. DURFEE.

Witnesses:
THOMAS BYRNE,
JAS. F. DUHAMEL.